United States Patent

[11] 3,573,377

[72] Inventors Harold P. Anderson
Lincroft;
James L. Simon, Middletown, N.J.

[21] Appl. No. 801,575
[22] Filed Feb. 24, 1969
[45] Patented Apr. 6, 1971
[73] Assignee Bell Telephone Laboratories, Incorporated
Murray Hill, N.J.

[54] EQUIPMENT TO COORDINATE ESTABLISHMENT OF AUDIO AND VIDEO CONNECTIONS THROUGH SWITCHING SYSTEMS
22 Claims, 4 Drawing Figs.

[52] U.S. Cl. .......... 179/2, 178/6, 179/18
[51] Int. Cl. .......... H04m 11/00, H04n 7/14
[50] Field of Search .......... 179/2 (DP), 18.1, 15 (W), 1 (VIS), 18 (CR), 100 (D), 100 (L), 175.1, 175.11, 175.2 (C), 2 (TV); 178/6 (PD)

[56] References Cited

UNITED STATES PATENTS 3,062,918 11/1962 Williford .......... 179/7
3,335,226 8/1967 Michael et al. .......... 179/18(.1)
3,475,557 10/1969 Morse et al. .......... 179/2(DP)

FOREIGN PATENTS 1,122,924 8/1968 Great Britain .......... 179/2(DP)

OTHER REFERENCES

Bell Laboratories Record, March 1949, p.p. 99-103, H.A. Lewis " Operating Control of Television Networks." (Copy available in Scientific Library of U.S. Patent Office)

*Primary Examiner*—William C. Cooper
*Assistant Examiner*—David L. Stewart
*Attorneys*—R. J. Guenther and James Warren Falk

ABSTRACT: A video switching system is provided for augmenting an existing audio switching system to extend video paths between customer video equipments. The video and audio paths are essentially independently established via separate switching system networks and equipment is included for coordinating and verifying each system connection to assure only matching audio and video paths are established.

INVENTORS H. P. ANDERSON
J. L. SIMON
BY Charles H Davis
ATTORNEY

EQUIPMENT TO COORDINATE ESTABLISHMENT OF AUDIO AND VIDEO CONNECTIONS THROUGH SWITCHING SYSTEMS

BACKGROUND OF THE INVENTION

Our invention concerns communication equipment and particularly, switching arrangements including separate switching networks for independently establishing path connections between customer stations. More particularly the invention relates to apparatus for controlling the separate establishment of video path connections to augment audio switching facilities.

Facilities for furnishing visual and also audio communications between telephone customers are necessarily more complicated and require more sophisticated control circuitry than audio-only switching arrangements. For example, paths conveying video communication signals require a wider bandwidth capability than audio signal paths since video signals contain higher frequency components. Also, such facilities must be selectively capable of establishing audio-only, or video and audio paths on a particular call as required by calling customers.

Some arrangements have been devised in the past for adding video communication to audio switching facilities, but those arrangements are costly, inefficient, and are limited to the particular type of system for which they have been devised. In one such arrangement, a video switching network is directly controlled by the existing audio network so that it is essentially in parallel with the latter network and there is a 1 to 1 correspondence between voice and video paths. That arrangement is manifestly inefficient because initially full video switching capability is furnished for all customer lines although customarily only a small percentage of customers are equipped with video station apparatus.

Proposals have been made to provide a switching facility for extending only video paths in conjunction with audio paths which are separately established. Such a arrangement has the distinct advantage that only customers with video station apparatus require access to the additional facility and it can therefore be tailored particularly to the video service. However, establishing portions of the same call via different switching systems gives rise to priorly unresolved problems. One problem is that call blockages in either system can cause the failure of the entire call. Another problem is that circuitry must be included to prevent the completion of the video and audio portions of a call from different calling customers to the same called customer.

In view of the foregoing, it may be appreciated that a need exists for a switching system to interconnect customers equipped for video service which system is entirely controlled in a conventional manner by the caller who can also select the type of call, i.e., audio-video or audio-only, and direct its establishment by dialing a single address code.

SUMMARY OF THE INVENTION

In accordance with the principles of our invention, an independently operated video switching system augments an existing audio switching system, illustratively a step-by-step switching system, for furnishing under control of customary calling signals separate video path connections to supplement mating audio path connections established via the existing system. The separate video system can be advantageously tailored to the video call traffic—the video network paths being provided solely on the basis of the video system traffic and grade of service desired. Accordingly, the size of the video network is independent of the network of the audio switching system and it may be minimized thereby reducing the cost of providing video call service.

The audio and video systems operate substantially independent of one another in the actual call establishment, and their action is coordinated to the extent required for insuring that separate video and audio connections to a called line match. Specifically, circuitry is advantageously included in the video switching system and actuated on each video-audio call to delay the completion of the corresponding audio connection until the video connection is completed. When the video connection is complete, the corresponding called audio line circuit is made busy to prevent other audio call connections (not associated with the video-audio call in progress) from being extended to the called line. At a precise moment, the busy condition is removed and the proper audio connection, also directed to proceed at that same moment by the video system, is established.

As an added safeguard, apparatus is included to verify each established video-audio connection to determine that the desired audio portion of the connection is established between the proper stations. A signal is connected to the audio path by the video system and it is coupled at both calling and called audio line circuits via test leads to the video system. The latter system which stores the identity of the calling and called parties during a call utilizes the stored data to locate and monitor a pair of the test leads which pair corresponds to the parties interconnected by the video network. If the signal is not detected by the video system on both leads within a prescribed time the audio and video connections are mismatched and the video connection is released leaving the established audio path connected.

Turning our attention now to the operation of our equipment during a call, when a caller desires an audio-video call connection, he dials a special service code preceding the dialing of the address of the called customer. The code and address, in the illustrative embodiment, are stored in a converter of the step-by-step audio system which converts customer generated multifrequency signals into dial pulse signals for operating the switch train. When the code is recorded by the converter a video control circuit is actuated for initiating the establishment of the video path. Concurrently, the latter circuit sends a signal to the converter for directing it to outpulse all digits except the last digit which is withheld and stored by the converter. As a result, the audio path is established through the first and intermediate selectors of the train and to the connector switch level assigned to the called customer but not onto the called customer terminal. While the latter connection is being established, the video control circuit determines the video network appearances both for the calling and called video line circuits, makes a busy test of the called line and, if idle, completes the video path entirely through a separate video network. When the video path is completed the corresponding called customer line appearance in the audio system is made busy temporarily to all audio call connections. The audio path is subsequently completed when the withheld digit is outpulsed and received at the connector switch. The transmission of the latter digit is synchronized with the unbusying of the called customer line appearance by the video network in order that the mating audio connection can be completed.

If the video portion of the call is blocked either because the called line is busy when tested or the called customer is not equipped with video receiving and transmitting apparatus, the video control circuit releases, abandoning the video connection. The audio connection, however, proceeds in a customary manner.

A feature of our invention is the provision of video switching equipment which is controlled by customary calling signals to establish video path connections as required in conjunction with corresponding audio path connections set up by a separate switching system.

Another feature of our invention pertains to equipment for controlling and insuring the establishment of mating, or associated, audio and video connections via separate switching systems between common calling and called customer lines.

A further feature relates to verification circuitry which is controllable after audio and video paths are established for verifying that both paths connect between common calling and called customer lines.

BRIEF DESCRIPTION OF THE DRAWING

The foregoing and other structural aspects and advantages of this invention will be more clearly understood from a reading of the following description of an illustrative embodiment with reference to the drawing in which.

Our video switching equipment may facilely augment any of various types of audio switching systems. To illustrate our invention, we have chosen as an audio switching system a step-by-step private branch exchange of the type in wide commercial use and having the capability of establishing two wire audio paths between customer lines. Such an exchange is disclosed in U.S. Pat. No. 3,133,155 to F. C. Kuchas of May 12, 1964. It is to be understood, however, that the present invention is not limited in application to augmenting step-by-step systems, but may be utilized with common control switching systems.

It is also noted that the equipment of our invention is capable of establishing connection for conveying data messages as well as video signals.

Figure 1:
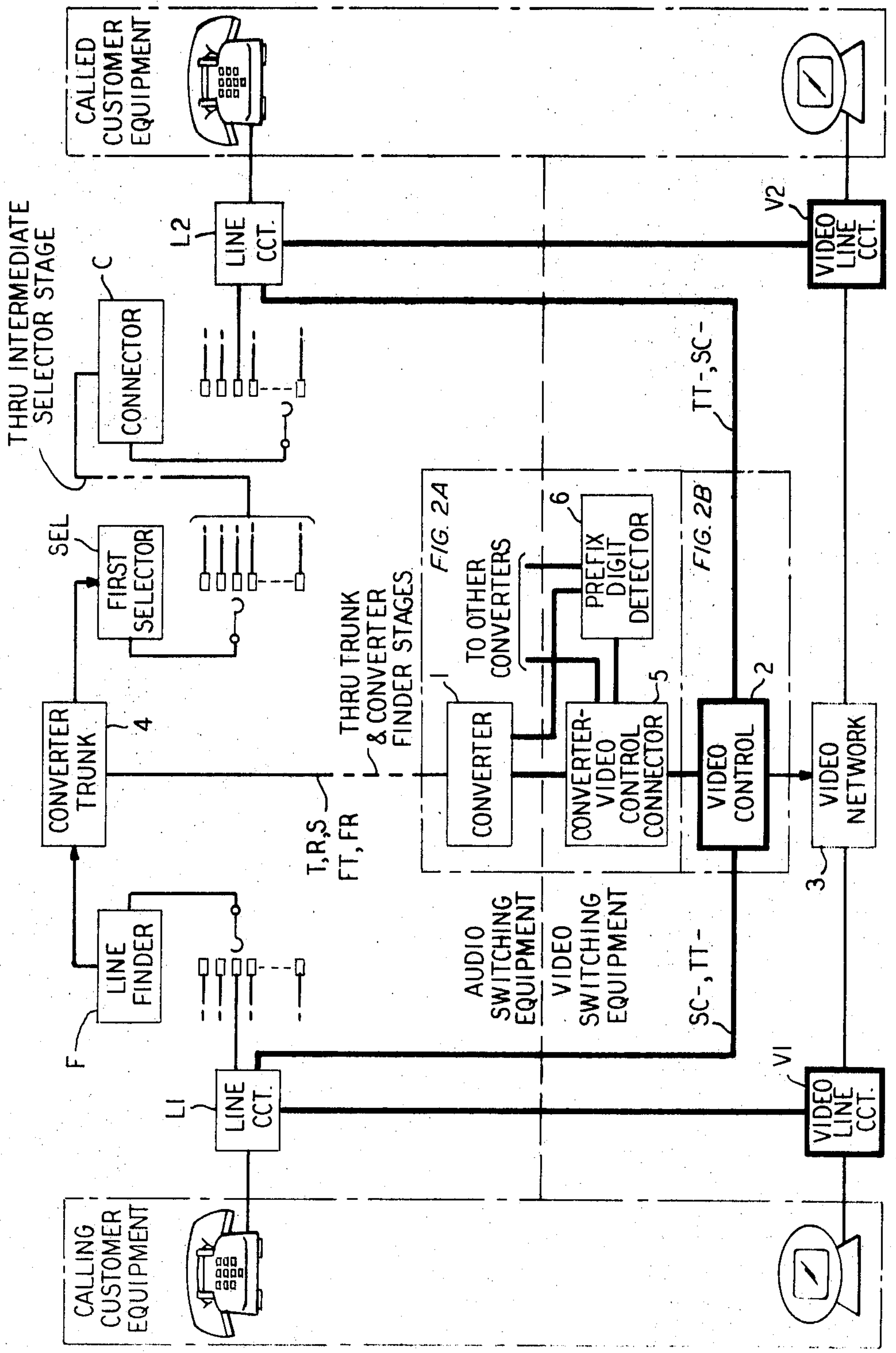
FIG. 1 is a block diagram showing the video switching equipment and control connections to audio switching equipment in accordance with one illustrative embodiment of our invention.

For purposes of illustration it is intended that the components of the audio switching equipment disclosed in FIG. 1 and comprising line circuits L1 and L2, line finder F, first selector SEL, connector C, converter trunk 4 and converter 1 be similar to the corresponding components disclosed in the Kuchas patent.

DETAILED DESCRIPTION

Turning now to the FIGS. and to details of our circuitry, it is considered that the best mode of illustrating the circuit functions and their interrelationships is to describe a call beginning at a point when a caller lifts his handset to initiate a video-audio call and to follow the equipment operation through to the point when both the video and audio paths are completed and verified. Preliminary to that description some of the circuits which are involved in the call establishment are separately considered.

In FIG. 1 there is shown calling and called customer equipment which includes a telephone subset and station video apparatus. Each customer subset connects to a station line circuit, L1 and L2, and the video apparatus connects to video line circuits, V1 and V2. FIG. 1 further shows two self-contained switching systems labeled "audio switching equipment" and "video switching equipment" capable respectively of establishing audio and video call connection paths between the aforementioned line circuits. The audio switching system comprises the usual step-by-step telephone switching system which includes linefinder F, first selector SEL, and connector C. Unlike most conventional step-by-step telephone switching system, however, converter trunk 4 is interposed between linefinder F and first selector SEL in the manner disclosed in the Kuchas patent. When the calling customer served by finder F goes off-hook, converter trunk 4 is connected to the calling subset and a connection between trunk 4 and an idle converter 1 is established via trunk and converter finder stages (not shown). It is the function of converter 1 to convert customer generated frequency signals into dial pulses suitable for controlling the customary operation of selector SEL, other intermediate selectors and connector C to process call connections.

The video switching equipment comprises in addition to the aforementioned video line circuits V1 and V2, a video control 2, prefix digit detector 6, video network 3 and converter-video control connector 5. An important circuit of the video equipment is video control 2 which is actuated each time a customer generated video call request signal is detected in converter 1 for controlling the establishment of video path connections concurrently with the establishment of audio path connections.

To further illustrate the operation of our video equipment, a call connection requested by the calling customer is described between the latter's terminal equipment and that of a called customer.

Connection to Converter 1

Let us assume that the calling customer of FIG. 1 desires to establish an audio-video call connection to another station. To initiate the call, the caller goes off-hook and in a customary manner the associated line circuit L1 responds and initiates a request for service to linefinder F. The latter is activated and it connects the wiper to a terminal connecting to circuit L1. Converter trunk 4 is also actuated and it serves to start trunk and converter finder switches (not shown) to establish a connection between trunk 4 and an idle converter 1. After that connection is established, the first selector SEL is seized over a path which includes the station loop of the calling station. Subsequently, the connection between the station loop and selector SEL is split at trunk 4 so that the station loop connects to converter 1 via leads T, R and S and the selector SEL is held via leads FT and FR. Dial tone is returned to the caller by converter 1 over the split path to indicate the converter connection and also that the caller may commence dialing.

Activation of Video Switching Equipment

The caller indicates that an audio-video connection is desired rather than a conventional audio-only by dialing a prefix, or special video service code, before dialing the called number address code. The prefix which is conveyed over the split path between the line circuit L1 and converter 1, is recorded in converter 1.

Figure 2A:
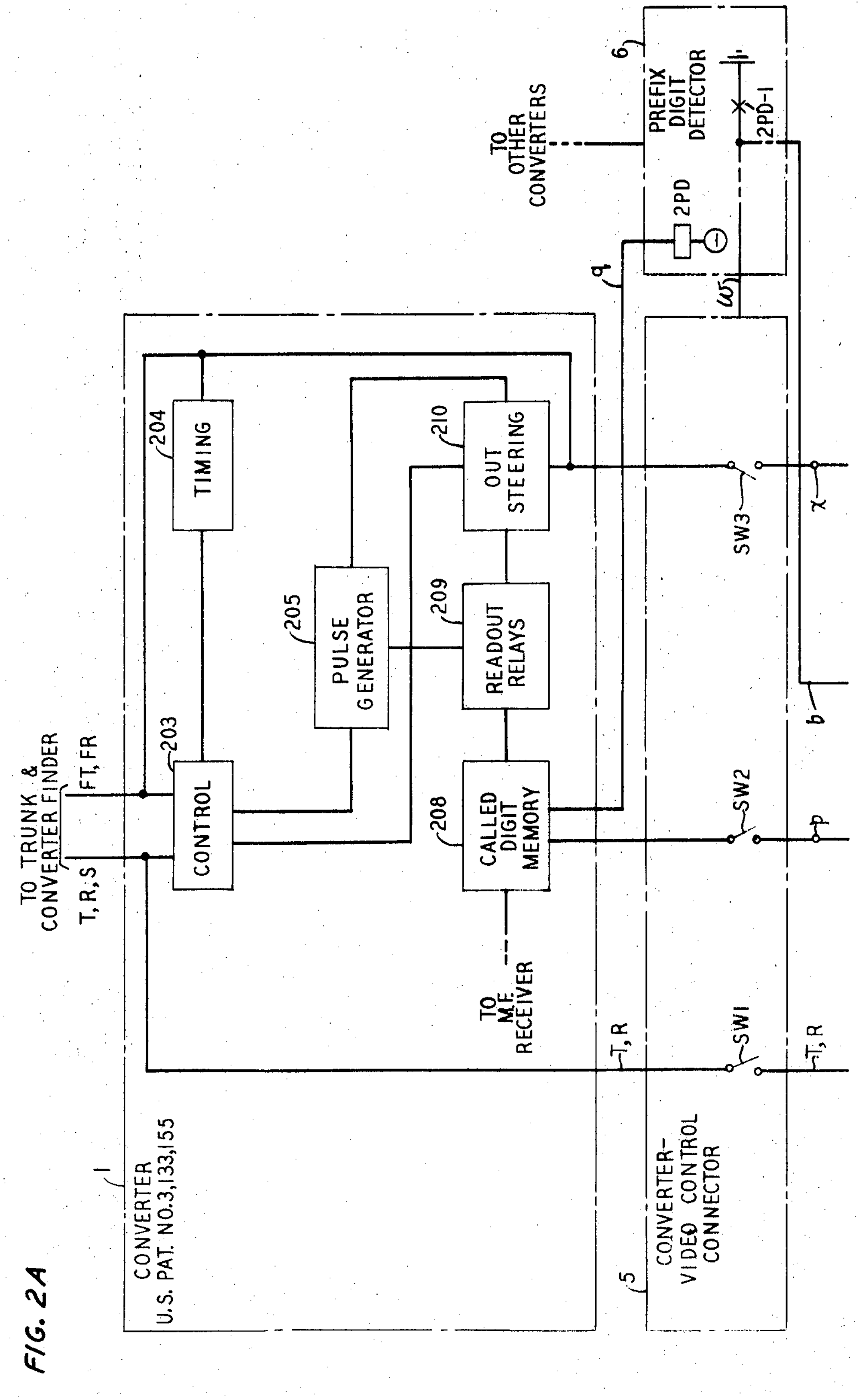
FIG. 2A depicts the circuitry of converter 1, converter-video control connector 5 and prefix digit detector 6.

Details of the circuitry of converter 1 are shown in FIG. 2A. It is noted, however, only portions of that circuit necessary to an understanding of our invention have been reproduced. For additional details reference may be made to the Kuchas patent. The designations used in the Kuchas patent are also used herein to point up the correspondence between identical functional units. With reference once again to the call, the prefix digit as well as the called customer address code is stored in called digit memory 208. To accommodate the storage of the extra digit. i.e., the prefix digit, an additional storage unit in memory 208 is added in a customary manner to the circuitry of Kuchas.

Prefix digit detector 6 monitors the recorded digits in converter 1 to determine the presence of the customer dialed special video service code for actuating the video path connection equipment and for connecting video control 2 to converter 1 via converter-video control connector 5. Relay 2PD of detector 6 connects to memory 208 via lead *q* and it operates when the special service code is recorded. Operated contact 2PD–1 connects ground to leads *w* and *b* for activating converter-video control connector 5 and the video start circuit 10 of video control 2. The latter is disclosed in detail in FIG. 2B which should be positioned below FIG. 2A.

Converter-video control connector 5 comprises preference circuitry for allotting the connection of converters, only one of which is shown in the illustrative embodiment, to video control 2. Upon the receipt of ground on lead *w*, and the determination that converter 1 has preference, switches SW1, SW2 and SW3 are operated to connect cable *p* and *x* and leads *b*, T and R from converter 1 to control 2. Switches SW1, SW2 and SW3 are illustrative and in actuality, the circuits closed by those switches are closed by contacts on preference or connector relays of connector 5. Such preference and connecting circuitry is conventional and for ease in presentation, that circuitry is omitted and instead switches are shown.

Operation of Video Switching Equipment

During conventional operation of the converter 1, i.e., when the caller desires only an audio path connection and therefore does not prefix the dialed address with the special service code, the stored address code is sent to readout relays 209 for directing pulse generator 205 which is controlled by control 203 to send dial pulses via leads FT and FR to actuate the switch train. After the full address code has been outpulsed, circuitry of converter trunk 4 removes the split connection for establishing a through or metallic path between linefinder switch F and switch SEL and also releases converter 1. The outpulsed digits in the customary manner direct the operation of intermediate selector switches as well as connector switch C to extend the audio path connection from line circuit L1 to line circuit L2, for example.

When the called address code is prefixed by the special video service code, the aforedescribed operation of signal converter 1 is automatically interrupted after a prescribed number of digits are outpulsed. This action prevents the completion of the audio connection to the called customer line circuit L2 until a video path connection is established entirely between the calling and called station video apparatus via line circuit V1 and V2 and video network 3.

Figure 2B:
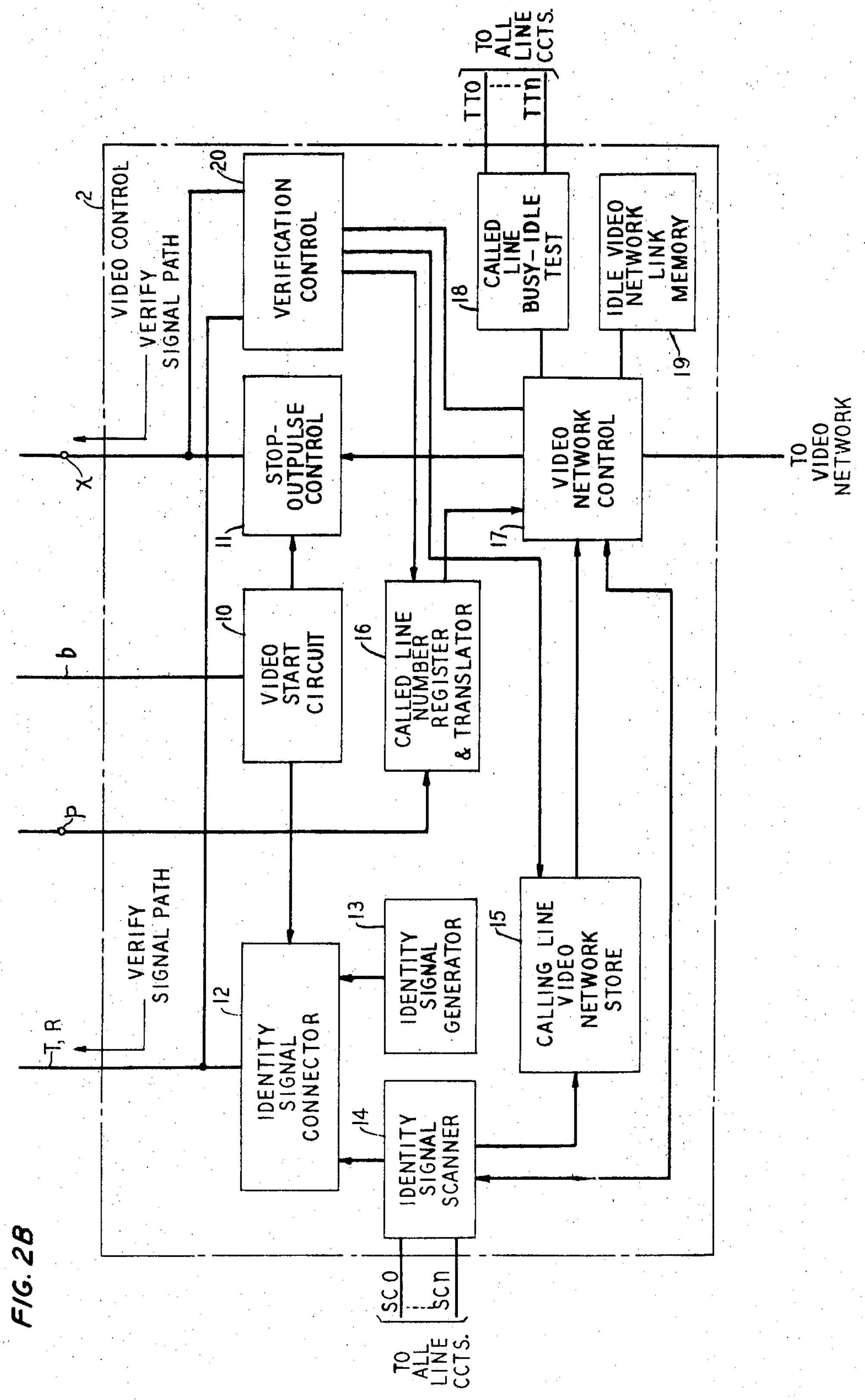
FIG. 2B shows video control 2.

Specifically, video start circuit 10 of FIG. 2B sends an instruction signal to stop-outpulse control 11 and the latter, in turn, sends a signal via cable *x* and operated switch SW3 to out steering 210 and to timing 204, both of converter 1. It is the function of out steering 210, as disclosed in Kuchas, to control the transmission of digits stored in digit memory 208 to generator 205 which outpulses the digits to the switch train. However, upon the receipt of the instruction signal out steering 210 withholds the transmission of the last digit to generator 205 allowing the other digits to be outpulsed. In this manner the audio path is partially established, i.e., through first selector SEL and intermediate selectors and through connector C which steps up to the proper level and is awaiting the last digit to connect to the called customer switch terminal appearance.

The instruction signal received at timing 204 changes the customary time-out operation by lengthening the time-out interval to allow for the establishment of the video path connection while the last digit is withheld by converter 1.

We turn our attention next to the actual establishment of the video path between the calling and called customer video line circuits, V1 and V2. It is the function of video control 2 to locate the calling and called video line circuits V1 and V2 on video network 3, to select an idle network 3 link, busy test the called customer terminal and direct the establishment of the video path at the proper time.

The location of calling video line circuit V1 on network 3 is determined by connecting an identity signal to leads T and R at converter 1 and by scanning via leads SC for that signal at the audio line circuits. Since there is a predetermined correspondence between audio and corresponding video line circuits and the customer terminal assignment in network 3, the determination of the calling audio line circuit identity also determines the terminal location in network 3. Specifically, video start circuit 10 of FIG. 2B sends a signal to identity signal connector 12 which, in turn, couples to leads T and R a special signal which is developed by identity signal generator 13. This signal may be traced through switch SW1, converter 1, trunk and converter finder switches, converter trunk 4 and linefinder F to line circuit L1. Video control 2, in particular at identity signal scanner 14, connects to each line circuit. When the identity signal is present, scanner 14 via leads SCO—SC*n* locates the particular line circuit, such as calling circuit L1 in the present example, and causes the corresponding video line circuit network location to be stored in calling line video network store 15.

For details of circuitry for connecting signals to network path connections and detecting such signals at line circuits in substantially the same manner as described hereinabove, reference may be made to the equipment commonly employed in automatic number identification systems such as for example disclosed in U.S. Pat. No. 3,062,918 to O. Williford of Nov. 6, 1962. Such equipment may illustratively be utilized to locate calling customer line circuit L1 in the present embodiment.

The network location of called customer video line circuit V2 is determined by called line number register and translator 16 from a translation of the dialed address code. It will be recalled that the customer dialed digits are stored in called digit memory 208. When switch SW2 is closed, the stored address code is sent via cable *p* to called line number register and translator 16. The latter converts this information in a customary manner into the equipment location of circuit V2 on network 3. This circuit function is analogous to conventional number group translation which is described in U.S. Pat. No. 2,585,904 to A. J. Busch of Feb. 19, 1952.

Figure 3:
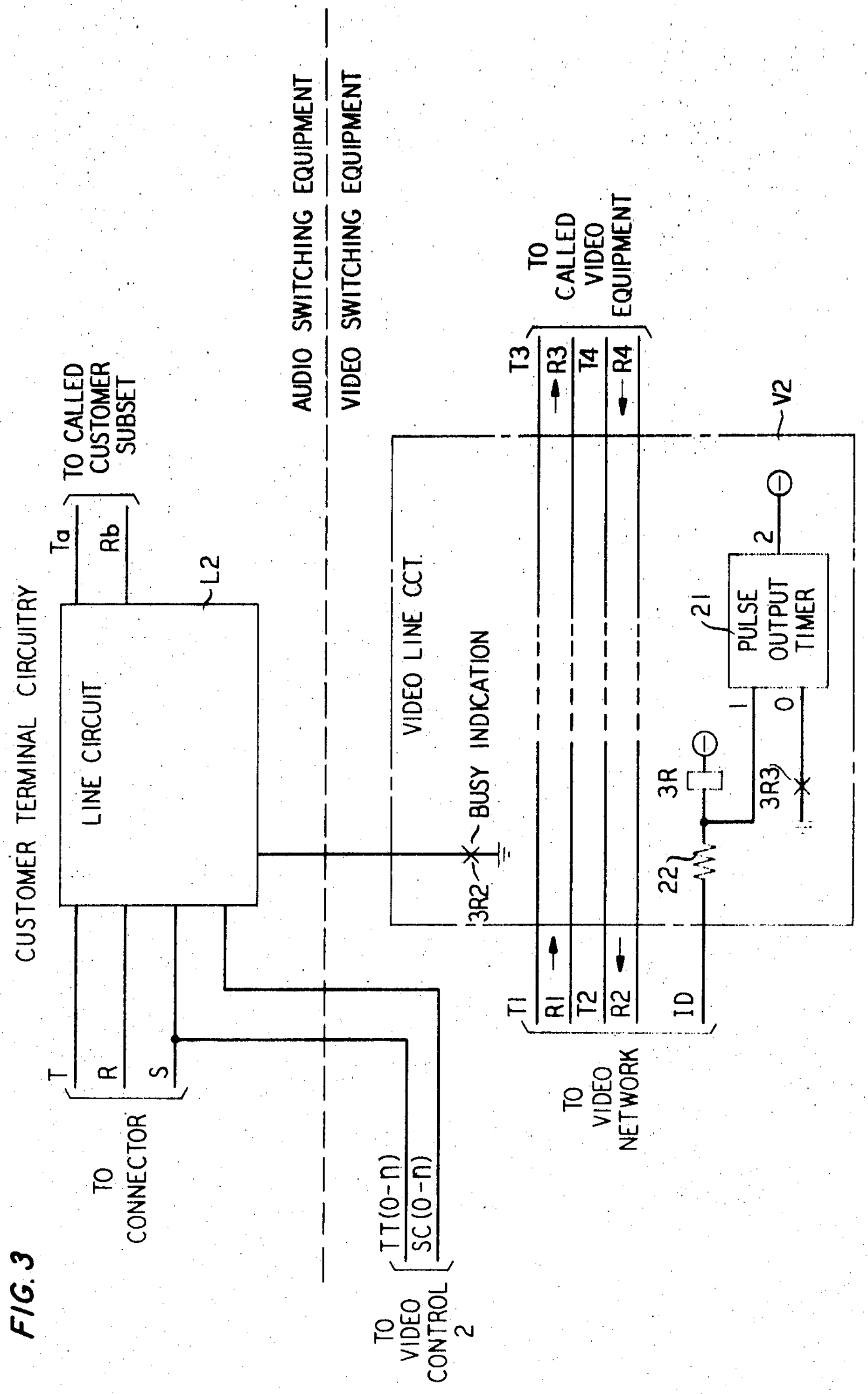
FIG. 3 discloses the called customer audio and video line circuits L2 and V2, respectively.

Before the establishment of the video path the called customer line circuit L2 is tested by video control 2 to determine its busy-idle condition. This is done by called line busy-idle test 18 over test leads TTO—TT*n* which extend to every audio line circuit. If either or both of the corresponding audio and video circuits L2 and V2 are busy, a busy indication is returned by the audio line circuit. Referring now to FIG. 3 showing the customer line circuitry, if ground appears on lead TT(O—*n*) the called customer is busy and if no potential (open) is detected thereon the called circuit is idle.

Specifically, video network control 17 determines that the busy-idle status of the called terminal is required when both the calling and called customer network locations are registered respectively in store 15 and translator 16. Control 17 couples the network location of the called customer recorded in translator 16 to called line busy-idle test 18 and this location information determines which one of leads TT(O—*n*) are to be tested. If the test determination is that the called line is busy or the called customer does not have video equipment, the call is blocked and is thereafter treated in the manner disclosed under the section headed "Call Blockages." If the terminal is idle, test 18 returns a signal to control 17 which selects an idle link from one of the links recorded in idle video network link memory 19 and directs the establishment of the video connection through network 3.

Establishment of Audio-Path Connection

It is now opportune to draw attention to an important aspect of our invention. The video switching equipment includes circuitry for insuring that the audio-path connection completed to called line circuit L2 after the video path is established between circuits V1 and V2 is solely from circuit L1. It must be remembered that the audio and video switching equipments are different switching units and respond to call address signals essentially independently of one another. Without circuitry to insure that established audio and video path connections match, an incongruous situation might arise wherein the audio and the video equipment of the called customer is each connected to different calling customers.

At a predetermined future time the busy indication on line circuit L2 is changed to idle and in conjunction with that operation, the video switching equipment directs the audio switching equipment to complete the audio-path connection. The action of both the called line circuit and of the audio switching equipment is synchronized during the completion of that call so that the probability that a foreign audio call connection can interfere with the proper connection is extremely remote.

With reference now to FIG. 3, the video path through network 3 is completed over leads T1, R1, T2 and R2 and line circuit V2 to the called customer. At the time the connection is completed, circuitry of the calling video line circuit V1 connects ground to lead ID for operating relay 3R in circuit V2. Operated contact 3R2 removes the idle line indication for circuit L2 by connecting ground to lead S which is the conventional line busy indication. It remains busy until just prior to the attempt to complete the matching audio connection when it is made idle once more. Operated contact 3R3 connects ground to terminal O of pulse output timer 21 which, after a prescribed timed interval, connects battery to terminal 1 for shunting down the relay 3R winding, releasing it for making circuit L2 appear special by removing ground from lead S. 2PD–1

It will be recalled that the last digit of the called customer address code is withheld by converter 1 and not outpulsed as a result of an instruction signal from video control 2. Immediately after the video path connection is complete to circuit V2 video network control 17 sends a signal to stop-outpulse control 11 which removes that instruction signal for allowing the withheld digit to be outpulsed by converter 1 in the customary manner. It is noted that the total time required to remove the instruction signal, to outpulse the last digit and step connector C onto the terminal appearance corresponding to circuit L2 is equal to the timing interval of pulse output timer 21. As a result, when connector C wiper steps onto the circuit L2 terminal appearance it is idle and the wanted connection is completed.

Connection Verification

After both the audio and video paths are established the video switching equipment is actuated to test the connections to assure that only the matching video and audio paths are in fact established. This is accomplished by connecting a verify signal to transmission leads of the audio path and by monitoring particular ones of leads SCO—SC*n* for the verify signal. If matching paths are established the verify signal is detected on the monitored leads and both converter 1 and video control 2 release. Otherwise a call blockage condition exists and the call proceeds as disclosed herein under the heading "Call Blockage."

Specifically, after the withheld digit is outpulsed by converter 1, video network control 17 automatically sends a signal to verification control 20 to begin a verification check of the connection. Control 20 couples a verify signal to leads T and R which connect to converter 1 and also via cable *x*, switch SW3 to leads FR and FT. As disclosed in Kuchas the audio transmission path is split at trunk 4 and the calling line connects to leads T and R while the called line connects to leads FT and FR. Considering first the signal coupled to leads T and R, it may be traced to calling line circuit L1 via switch SW1, trunk and converter finder stages, trunk 4 and finder F. The path for connecting the verify signal to called line circuit L2 may be traced via leads FR and FT, trunk and converter finder stages, trunk 4, selector SEL, intermediate selector stages and connector C.

It will be recalled that the calling and called line identities are presently stored in respective store 15 and translator 16 of control 2. On a command signal from verification control 20 both circuits send their stored identity data to network control 17 which directs signal scanner 14 to monitor two of leads SCO—SC*n* corresponding to the calling and called identities. As may be seen in FIG. 3, for example, one of the leads SC(O—*n*) connects to audio line circuit L2 and thereat couples to the transmission path, leads T and R. It is noted that leads FT and FR from converter 1 connect to respective leads T and R of the called line circuit via the switch train and therefore the verify signal is coupled to the lead SC(O—*n*) corresponding to the called line circuit L2. Similarly, the verify signal is coupled at calling line circuit L1 to another one of leads SC(O—*n*)

If signals are detected on monitored leads SC(O-n) by scanner 14, a check signal is returned by scanner 14 to control 17 which subsequently controls the release of video control 2 and converter 1 from the connection, the latter as disclosed in Kuchas.

If scanner 14 within a predetermined interval fails to return the check signal, control 20 signals network control 17 that a call blockage condition exists. See the discussion under the heading "Call Blockage" for additional details.

CALL BLOCKAGES

Called Line Busy

If the called customer line is busy, the condition is detected by called line busy-idle test 18. The latter sends a signal to video network control 17 which, in turn, signals stop-outpulse control 11 to send a signal to converter 1 for allowing converter 1 to outpulse immediately the withheld digit. Thereafter video control 2 releases and the call progresses as an audio-only call connection between calling and called customers. If the audio-only connection is also blocked busy tone is returned to the caller by connector C in the usual manner.

Video-Audio Path Mismatch

In the event the audio and video connections do not match as determined by verification control 20, a signal is sent to video network control 17 which releases the established video-path connection through network 3. Subsequently, video control 2 releases, leaving converter 1 to execute a customary release operation as disclosed in Kuchas. Thereafter video control 2 is available to serve other audio-video call requests.

Video Call To Unequipped Lines

In the event the caller requests a video-audio connection to a terminal not equipped to receive video calls, that request is intercepted by the video switching equipment. Customers not equipped with video apparatus have their corresponding leads TT(O—*n*) cross connected at busy-idle test 18 for interception in a conventional manner. If a video-audio connection is requested for such a customer line, test 18 automatically sends a signal to control 17 for releasing the video equipment as above described. The call thereafter progresses as an audio-only call and is established by the audio switching equipment in a conventional manner.

Our invention is considered applicable also to the establishment of audio-video call connections between trunk circuits as well as between stations. Furthermore, it is considered that it is within the scope of our teaching to utilize our equipment in other common control switching systems to furnish separately established video connections. It is to be further understood that the above-described arrangements are illustrative of the application of the principles of our invention. Accordingly, various other arrangements may be devised by those skilled in the art without departing from the spirit and scope of the invention.

We claim:

1. A communication system comprising:
first and second separate switching systems each being responsive to calling signals for interconnecting customer stations via respective first and second connections;
control means connected between said systems and controlled by a calling one of said stations for selectively coupling calling signals received in said first system to said second system for actuating said second system to establish a second connection between said calling station and a called one of said stations; and
means responsive to said control means after said second connection is established for thereupon establishing a first connection between said same calling and called stations in response to said calling signals.

2. The invention recited in claim 1 further comprising:
means connecting said called station directly to said first and second switching systems for terminating respectively said first and second connections;
means for indicating that said direct connection from said called station to said first switching system is busy to prevent the establishment of all connections via said first switching system to said called station after the establishment of said second connection; and
means cooperating with said first switching system for removing said busy indication for allowing the exclusive establishment of said second connection to said called station.

3. The invention set forth in claim 2 wherein said removing means comprises timing means activated upon the completion of said second connection for timing a predetermined time interval after which said first connection is completed to said called station.

4. The invention recited in claim 1 wherein said first switching system includes circuitry controlled by said control means for establishing a portion of said first connection concurrent with the establishment of said second connection.

5. The invention recited in claim 4 wherein said first switching system comprises outpulsing means for sending directing signals representative of an address of said called station for controlling the establishment of said first connection, and further including means in said second switching system for controlling said outpulsing means to send only a portion of said directing signals before said second connection is established and the remaining portion after said second connection is established.

6. The invention set forth in claim 1 including circuitry actuated after the establishment of said first and second connections for verifying that said established first and second connections originate at the same calling station.

7. The invention set forth in claim 6 wherein:
said verifying circuitry includes means for connecting a special signal to said first connection;
means at said calling and called stations coupling said special signal to said control means; and
means in said control means for detecting said special signal to verify that said first and second connections originate at said calling station.

8. The invention recited in claim 7 including means activated by said detecting means for releasing said second connection when first and second connections to said called station originate at different calling stations.

9. The invention recited in claim 1 wherein said first switching system includes means for recording said signals, and said control means includes digit detector means connected to said recording means for detecting a video service code in said signals for actuating said second switching system to establish a second connection between said calling and called stations.

10. In a communication system arranged to establish audio-only and video-audio call connections between calling and called customer line terminals:
an audio line circuit and video line circuit for connecting each customer terminal respectively to an audio switching system and to a video switching system;
means in said video line circuit responsive to a call connection established thereto via the video switching system for sending a signal to said audio line circuit; and
means in said audio line circuit connecting said signal to the audio switching system for preventing the establishment of all call connections via said audio switching system to said audio line circuit prior to the establishment of a prescribed audio connection.

11. The invention set forth in claim 10 further including means actuated a predetermined time after the establishment of a call connection to said video line circuit for removing said signal to permit the establishment of said prescribed call connection via said audio switching system to said audio line circuit.

12. A video switching system for augmenting an audio switching system to furnish in response to a video service request signal a video path via a separate network in the video switching system in conjunction with an audio path established via said audio switching system comprising:
means monitoring said audio switching system for detecting said request signal for actuating said video switching system;
means actuated after detection of said signal for inhibiting the operation of said audio switching system to delay the completion of said audio path in response to a received address code; and
means in said video switching system responsive to said code for establishing said video path through said separate network prior to the completion of said audio path by said audio switching system.

13. The invention set forth in claim 12 further including:
digit outpulsing apparatus in said audio switching system responsive to said code for sending directing signals to control the establishment of said audio path; and
wherein said inhibiting means connects to said digit outpulsing apparatus for controlling said apparatus to withhold a portion of said directing signals until said video path is established.

14. The invention set forth in claim 12 further including:
a plurality of customer stations each having an audio line circuit and an associated video line circuit;
said video line circuit comprising means responsive to a video path connection thereto for sending a busy signal to said associated audio line circuit; and
said audio line circuit including means for connecting said busy signal to said audio switching system prior to the establishment of said audio path for preventing the establishment of all paths via said audio line circuit to said customer equipment.

15. The invention set forth in claim 14 wherein said video line circuit includes means automatically actuated after a predetermined time interval for removing said busy signal from said audio line circuit to permit the exclusive establishment of said audio path to said audio line circuit.

16. The invention recited in claim 14 including verifying circuitry comprising:
means connecting a verify signal to said audio path;
means at a calling and called one of said audio line circuits for coupling said audio path to said video switching system; and
means in said video switching system connected to said coupling means for detecting said verify signal received via said calling and called line circuits to verify that said established audio and video paths connect to a common calling customer line.

17. The invention recited in claim 16 including means activated by said detecting means for releasing said video path to convert the connection from video-audio connection to an audio-only connection.

18. The invention recited in claim 12 further including:
means for determining the busy-idle condition of a called line prior to establishment of said video path; and
means for controlling said inhibiting means to proceed with the establishment of said audio path only when said called line is marked temporarily busy.

19. Equipment for controlling the establishment of separate audio and video connections via respective audio and video switching systems comprising:
means in said audio system responsive to calling signals for establishing a portion of said audio connection between a calling and a called station;
means in said video system for establishing said video connection between the calling and called stations in response to said signals;
means in said audio system effective upon the completion of said video connection for busying said called station to all connections via said audio system;
means controlling said audio system for completing the remainder portion of said audio connection at a predetermined time; and in which
said busying means cooperates with said controlling means to unbusy said called station for allowing the exclusive establishment of said audio connection to said called station.

20. In a communication system including:
two switching equipment units for establishing separate video and audio call connections via said respective equipment units between a pair of equipment terminals;

means in a first one of said units responsive to a video service request signal received at the other one of said units for preventing the establishment of a connection via said other unit between said terminals; and means in the first unit responsive after a connection is established via said first unit between said terminals for controlling the establishment of a separate connection via said other unit between said terminals.

21. Equipment for establishing audio and video path connections between respective calling and called customer audio and video line circuits comprising:

an audio switching system for controlling the establishment of said audio path and a video switching system for controlling the separate establishment of a video path;

said audio switching system including a switch train responsive to directive signals for extending a connection between customer line circuits;

a converter connected to said calling customer audio line circuit in response to a request for service signal by said calling customer; and means for storing calling customer generated signals and including means for outpulsing directive signals corresponding to said stored signals for controlling the operation of the switch train;

said video switching system including a prefix digit detector for detecting a video service code sent by said calling customer and stored in said converter;

a video controller activated by said detector for controlling the establishment of said video path from said calling customer video line circuit to said called customer video line circuit; and means in said controller concurrently actuated to send an inhibit signal to said outpulsing means which withholds outpulsing of directive signals corresponding to one of the stored signals to prevent establishment of said audio path;

means in said called customer video line circuit for sending a busy signal to said called customer audio line circuit prior to completion of said audio path thereto;

means in said called customer audio line circuit coupling said busy signal to said audio switching system for preventing all call connections to said called customer audio line circuit;

means in said video switching system subsequently actuated for sending a signal to said outpulsing means for controlling the sending of the withheld directive signals to complete the extension of said audio path; and and in which circuitry of said called customer video line circuit is operationally synchronized with extension of said audio path to remove said busy signal for permitting the establishment of said audio path to said called customer audio line circuit.

22. Call verification equipment for verifying a completed audio call connection as well as an associated video call connection established in response to a single call request and interconnecting respective pairs of audio and video lines by a separate switching network comprising:

means for connecting a verify signal to said audio call connection for propagation to a calling and called one of said audio lines interconnected thereby;

means for determining the identity of a calling and called ones of said video lines interconnected by said associated video call connection; and means connected to particular ones of said audio lines responding to the determined indentity of said video lines for detecting said verify signal to assure the establishment of compatible connections via said separate networks.